United States Patent
Prinsen et al.

(10) Patent No.: US 7,303,496 B2
(45) Date of Patent: Dec. 4, 2007

(54) TRANSVERSE ELEMENT HAVING A DISTANCE SURFACE BETWEEN A SUPPORTING SURFACE AND A PULLEY SHEAVE CONTACT SURFACE

(75) Inventors: Lucas Hendricus Robertus Maria Prinsen, AC Loon op Zand (NL); Cornelis Johannes Maria van der Meer, XG Tilburg (NL); Marco van Schaik, KZ Breda (NL)

(73) Assignee: Van Doorne's Transmissie B.V. (NL)

( * ) Notice: Subject to any disclaimer, the term of this patent is extended or adjusted under 35 U.S.C. 154(b) by 582 days.

(21) Appl. No.: 10/719,215

(22) Filed: Nov. 20, 2003

(65) Prior Publication Data

US 2004/0106485 A1    Jun. 3, 2004

(30) Foreign Application Priority Data

Dec. 3, 2002   (NL) .................................. 1022072

(51) Int. Cl.
*F16G 1/28* (2006.01)
*F16G 5/20* (2006.01)

(52) U.S. Cl. ...................................... 474/242; 474/201

(58) Field of Classification Search ........ 474/242–245, 474/201, 237
See application file for complete search history.

(56) References Cited

U.S. PATENT DOCUMENTS

| | | | | |
|---|---|---|---|---|
| 4,790,798 A * | 12/1988 | Hattori | ........................ | 474/242 |
| 5,346,440 A * | 9/1994 | Smeets | ........................ | 474/242 |
| 6,203,460 B1 * | 3/2001 | Parks et al. | .................. | 474/242 |
| 6,440,024 B1 * | 8/2002 | Kobayashi | .................. | 474/242 |
| 6,599,212 B2 * | 7/2003 | Kanokogi et al. | .......... | 474/242 |

FOREIGN PATENT DOCUMENTS

| | | | |
|---|---|---|---|
| EP | 1 130 283 A2 | 9/2001 | |
| EP | 1 199 494 A2 | 4/2002 | |
| JP | 62-52238 A * | 3/1987 | ................. 474/242 |
| JP | 63-266248 A * | 11/1988 | ................. 474/242 |
| JP | 03-229039 A * | 10/1991 | ................. 474/248 |
| WO | WO 02/061304 A1 | 8/2002 | |

OTHER PUBLICATIONS

Search Report for NL 1022072.

* cited by examiner

*Primary Examiner*—Marcus Charles
(74) *Attorney, Agent, or Firm*—Troutman Sanders LLP; Trenton A. Ward, Esq.

(57) ABSTRACT

A transverse element for a push belt for a continuously variable transmission comprises a supporting surface for supporting a carrier of the push belt, and a pulley sheave contact surface for contacting pulley sheaves of the continuously variable transmission. A curved transition surface is connected to the supporting surface, whereas a distance surface is located between this transition surface and the pulley sheave contact surface. The distance surface is positioned lower than the supporting surface. When the transverse element collides with a relatively large collision element like another transverse element, protrusions may be developed exclusively on the distance surface. These protrusions are not capable of inflicting damage on a carrier which is to be laid on the supporting surface, because these protrusions do not protrude beyond the level of the supporting surface.

3 Claims, 3 Drawing Sheets

TRANSVERSE ELEMENT HAVING A DISTANCE SURFACE BETWEEN A SUPPORTING SURFACE AND A PULLEY SHEAVE CONTACT SURFACE

CROSS REFERENCE TO RELATED APPLICATIONS

This application claims the benefit of Dutch Patent Application No. 1022072, filed 3 Dec. 2002.

FIELD OF THE INVENTION

The present invention relates to a transverse element for a push belt for a continuously variable transmission, comprising: a supporting surface for supporting a carrier of the push belt; a pulley sheave contact surface which is destined to abut against a contact surface of a pulley sheave of a pulley of the continuously variable transmission; and a transition edge region which is connected to the supporting surface on the one hand, and which is connected to the pulley sheave contact surface on the other hand.

BACKGROUND OF THE INVENTION

Such a transverse element is generally known, and is destined for application in a push belt of a continuously variable transmission. Such a push belt comprises two sets of rings which function as carriers of a number of transverse elements. These rings are relatively flat and wide, i.e. the radial distance between an inner circumference and an outer circumference of the rings is relatively small with respect to the dimension in the axial direction. The transverse elements are continuously arranged along the entire circumference of the rings, so that they are able to transmit forces which are related to a movement of the push belt during operation.

BRIEF SUMMARY OF THE INVENTION

In the following description of a transverse element, the mentioned directions refer to the situation in which the transverse element is part of the push belt. A longitudinal direction of the transverse element corresponds to a circumferential direction of the push belt. A vertical transverse direction of the transverse element corresponds to a radial direction of the push belt. A horizontal transverse direction of the transverse element corresponds to a direction perpendicular to both the longitudinal direction and the vertical transverse direction. Furthermore, a side of the transverse element, which in the push belt is situated at the outer circumference, is considered as upper side of the transverse element, whereas a side of the transverse element, which in the push belt is situated at the inner circumference, is considered as under side of the transverse element.

In the longitudinal direction, the transverse element has small dimensions, in other words, the transverse element has a small thickness. A front surface and a back surface of the transverse element extend in the horizontal transverse direction and in the vertical transverse direction. A standing surface which is situated between the front surface and the back surface will hereinafter be referred to as circumferential surface of the transverse element.

On both sides, the transverse element is provided with recesses for at least partially receiving the rings. For the purpose of supporting the rings, the transverse element comprises supporting surfaces.

Furthermore, for the purpose of contact between the transverse element and the pulley sheaves of the continuously variable transmission, the transverse element is on both sides provided with pulley sheave contact surfaces, which are divergent in the direction of the supporting surfaces. A supporting surface and a pulley sheave contact surface which are situated at one side of the transverse element are interconnected through a convexly curved transition surface.

In the vertical transverse direction, the transverse element comprises successively a basic portion, a neck portion and a top portion, wherein the dimensions of the neck portion in the horizontal transverse direction are considerably smaller than the dimensions of the basic portion and the top portion, respectively, in the horizontal transverse direction, in other words, the neck portion is relatively narrow. In the push belt, the basic portion is situated at the side of the inner circumference of the push belt, whereas the top portion is situated at the side of the outer circumference of the push belt. The supporting surfaces and the pulley sheave contact surfaces are part of the basic portion.

The transverse element is formed out of a basic product which is obtained by means of blanking. The surface of the basic product is post-treated with the help of a tumbling process, wherein the basic product is intermittently put in contact with tumbling stones. During this post-treatment process, a number of basic products and a number of tumbling stones move continually around each other. The basis products touch each other inter alia at the place where the supporting surface and the pulley sheave contact surface are interconnected. Research has shown that in this way, in the immediate vicinity of this place, protrusions may be developed, which protrude above the level of the supporting surface. This may also happen during other processes, for example during sorting of the transverse elements, wherein the transverse elements also collide with each other, or during blanking of the basic products, wherein the blanked products land on a surface of a receiving sheet. When the rings are inserted in the recess in the transverse element and are laid on the supporting surface during the manufacture of the push belt, the rings may be damaged by the protrusions. Also, during operation of the push belt, damage of the rings may occur, when the rings continually come into contact with the protrusions. It has appeared in practice that in case of a protrusion being higher than 15 μm with respect to the supporting surface, the rings are often damaged in such a way that the life span of the push belt is considerably shortened, as a result of the fact that the carrier prematurely breaks.

It is an objective of the present invention to provide a transverse element having such a shape that protrusions, which are developed as a result of situations in which the transverse element collides with a relatively large collision element like another transverse element, are not capable of inflicting damage on the rings. What is meant by a relatively large collision element is an element having such dimensions that it is capable of simultaneously touching the basic portion and the top portion of the transverse element.

According to an important aspect of the present invention, the transition edge region comprises a concave portion.

Due to the fact that the transition edge region of the transverse element according to the present invention has a concave portion, it is possible that this transition edge region comprises a sub-region contiguous to the pulley sheave contact surface, which is situated such that in case of a collision of the transverse element with a relatively large collision element, protrusions are developed exclusively in this sub-region, wherein, in addition, these protrusions are not capable of extending above the level of the supporting surface. In that case, the protrusions are not capable of inflicting damage on the rings. It is of importance that a distance between the supporting surface and the sub-region, which is measured along the surface, is sufficiently large for preventing the development of protrusions on the supporting surface itself. At the same time, it is of importance that a height difference between the supporting surface and the sub-region is sufficiently large for preventing the protrusions from extending above the level of the supporting surface.

Within the scope of the present invention, an embodiment is possible, wherein the above-mentioned sub-region of the transition edge region comprises a completely flat distance surface, which, on the one hand, is connected to the pulley sheave contact surface, through a rounded off surface, and which, on the other hand, is connected to the concave portion. The dimensions of the distance surface in the horizontal transverse direction may be chosen such that a tangent plane which touches the circumferential surface of the transverse element at both the basic portion and the top portion, and which thereby is representative of the way in which a relatively large collision element touches the transverse element, touches the basic portion at the rounded off surface. In that case, the distance between the supporting surface and the rounded off surface is sufficiently large for preventing protrusions from developing outside the distance surface and from extending above the level of the supporting surface.

BRIEF DESCRIPTION OF THE DRAWINGS

The present invention will be explained in more detail on the basis of the following description of a preferred embodiment of a transverse element according to the invention with reference to the drawing, in which equal reference numerals indicate equal or similar parts, and in which.

DETAILED DESCRIPTION OF A PREFERRED EMBODIMENT

Figure 1:
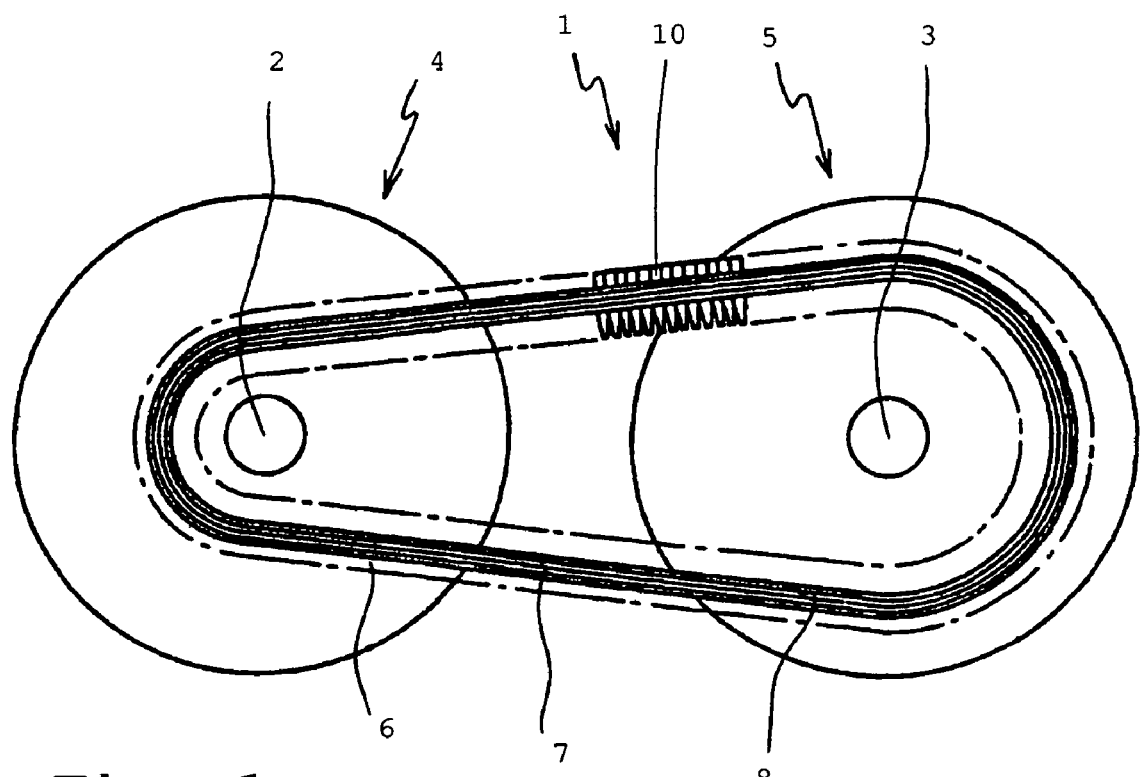
FIG. 1 is a diagrammatical side view of a continuously variable transmission having a push belt.

FIG. 1 diagrammatically shows a continuously variable transmission, such as for utilization in a motor vehicle. The continuously variable transmission is indicated in general by the reference numeral 1.

The continuously variable transmission 1 comprises two pulleys 4, 5 being arranged on separate pulley shafts 2, 3. An endless push belt 6, which is shaped like a closed loop, is arranged around the pulleys 4, 5 and serves for transmitting torque between the pulley shafts 2, 3. Each of the pulleys 4, 5 comprises two pulley sheaves, wherein the push belt 6 is positioned and clamped between said two pulley sheaves, so that a force may be transmitted between the pulleys 4, 5 and the push belt 6, with the help of friction.

The push belt 6 comprises at least one endless carrier 7, which is usually composed of a number of rings 8. Along the entire length of the carrier 7, transverse elements 10 are arranged, wherein the transverse elements 10 are mutually adjacent to each other. For the sake of simplicity, only a few of these transverse elements 10 are shown in FIG. 1.

Figure 2:
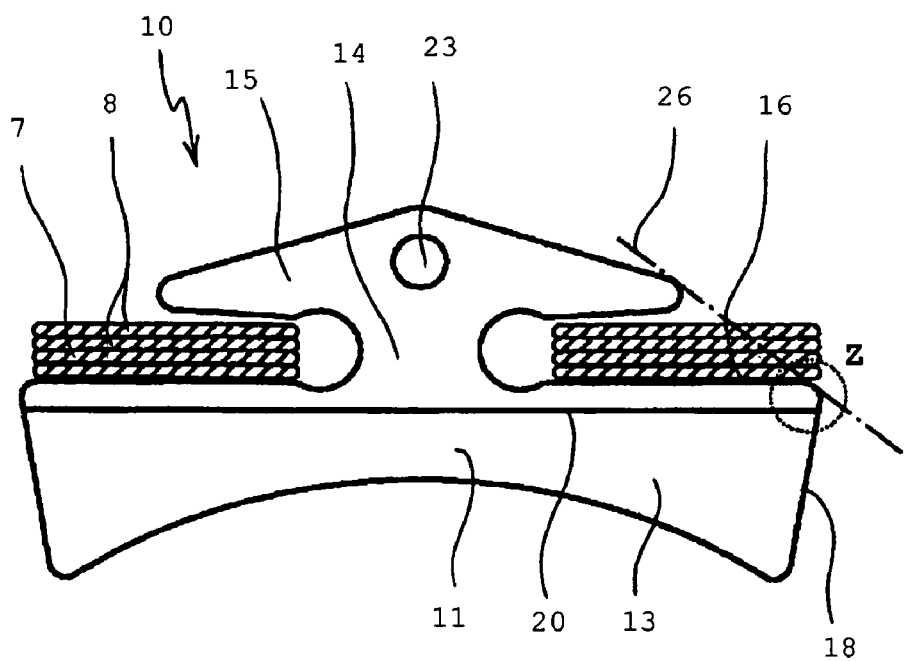
FIG. 2 is a front view of a transverse element according to a preferred embodiment of the present invention.
Figure 3:
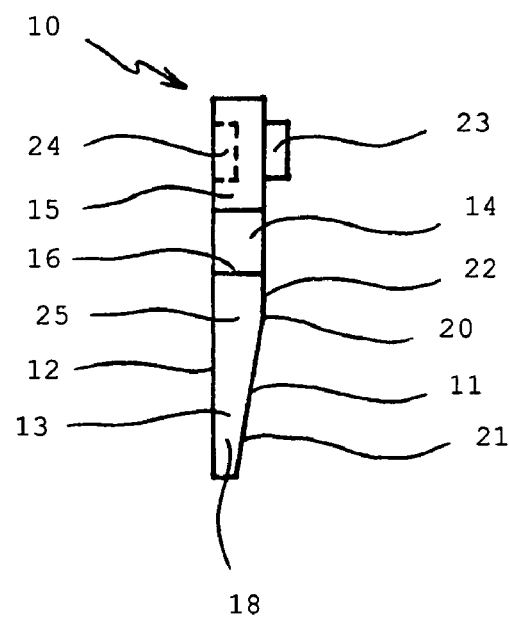
FIG. 3 is a side view of the transverse element which is shown in FIG. 2.

FIGS. 2 and 3 show a transverse element 10. A front surface of the transverse element 10 is indicated in general by the reference numeral 11, whereas a back surface of the transverse element 10 is indicated in general by the reference numeral 12. A portion of the surface of the transverse element 10, which is situated between the front surface 11 and the back surface 12, is hereinafter referred to as circumferential surface 25.

In the vertical transverse direction, the transverse element 10 comprises successively a basic portion 13, a relatively narrow neck portion 14 and a top portion 15 which is shaped like the tip of an arrow. In the push belt 6, the basic portion 13 is situated at the side of the inner circumference of the push belt 6, whereas the top portion 15 is situated at the side of the outer circumference of the push belt 6.

At the place where the basic portion 13 of the transverse element 10 is connected to the neck portion 14, said basic portion 13 comprises two supporting surfaces 16 which serve for supporting two carriers 7. Furthermore, the basic portion 13 comprises two pulley sheave contact surfaces 18. When the transverse element 10 moves over the pulley 4, 5, contact between the transverse element 10 and contact surfaces of the pulley sheaves is established through said pulley sheave contact surfaces 18.

The supporting surface 16 is not of a completely flat design, but has in a somewhat convex shape in a plane perpendicular to the longitudinal direction, whereby the carrier 7 will center itself on said supporting surface 16 during operation of the continuously variable transmission 1. The radius of the curvature of the supporting surface 16 is so large that no expression is given to said curvature in the figures. The value of the radius of the convex curvature of the supporting surface 16 may vary along the supporting surface 16.

On the front surface 11 of the transverse element 10, a tilting line 20 is defined. The tilting line 20 is situated at the basic portion 13, and, in the shown example, extends along the entire width of the transverse element 10. In FIG. 3, it can be seen that in this example, the tilting line 20 is situated at a convex transition region between a portion 21 of the front surface 11, which is inclined with respect to the back surface 12, and a portion 22 of said front surface 11, which extends substantially parallel to the back surface 12. An important function of the tilting line 20 is guaranteeing mutual contact between adjacent transverse elements 10 when said transverse elements 10 move over one of the pulleys 4, 5 during a movement of the push belt 6, for example.

At the front surface 11 of the transverse element 10, a projection 23 is arranged. In the shown example, the projection 23 is located at the top portion 15, and corresponds to a hole in the back surface 12. In FIG. 3, the hole is depicted by means of dashed lines, and indicated by the reference numeral 24. In the push belt 6, the projection 23 of the transverse element 10 is at least partially located inside the hole 24 of a subsequent transverse element 10. The projection 23 and the corresponding hole 24 serve to prevent mutual displacement of adjacent transverse elements 10, in a plane perpendicular to the circumferential direction of the push belt 6.

In FIG. 2, an imaginary tangent plane 26, which touches the circumferential surface 25 of the transverse element 10 at both the basic portion 13 and the top portion 15, is diagrammatically depicted by means of a dash and dot line. This tangent plane 26 is representative of the way in which a relatively large collision element touches the transverse element 10.

In a phase of the manufacturing process of the transverse element 10, the transverse element 10 is subjected to a tumbling process, for the purpose of removing any unevenness from the surface of the transverse element 10. During this process, the transverse element 10 is intermittently put in contact with tumbling stones, wherein a number of transverse elements 10 and a number of tumbling stones move continually around each other. During the tumbling process, the transverse elements 10 touch each other, from all kinds of directions, at all kinds of places. One possibility is that a transverse element 10 touches another transverse element 10 at the place where the tangent plane 26 also touches.

In a transverse element 10 according to the state of the art, an imaginary tangent plane as described in the foregoing touches a curved transition surface, which is located between the supporting surface 16 and the pulley sheave contact surface 18. When a collision element touches the transverse element 10 at a place which is also touched by the tangent plane 26, protrusions may be developed, which extend above the level of the supporting surface 16. During the manufacture of the push belt 6, a bottom ring 8 of the carrier 7 may be damaged by these protrusions when the carrier 7 is inserted in the space between the basic portion 13 and the top portion 15, and is laid on the supporting surface 16. Damage of the bottom ring 8 may also occur during operation of the push belt 6. Even in case of the protrusions having a height of just a few micrometers, the bottom ring 8 may already be damaged to such an extent that the life span of the push belt 6 is shortened.

Figure 4:
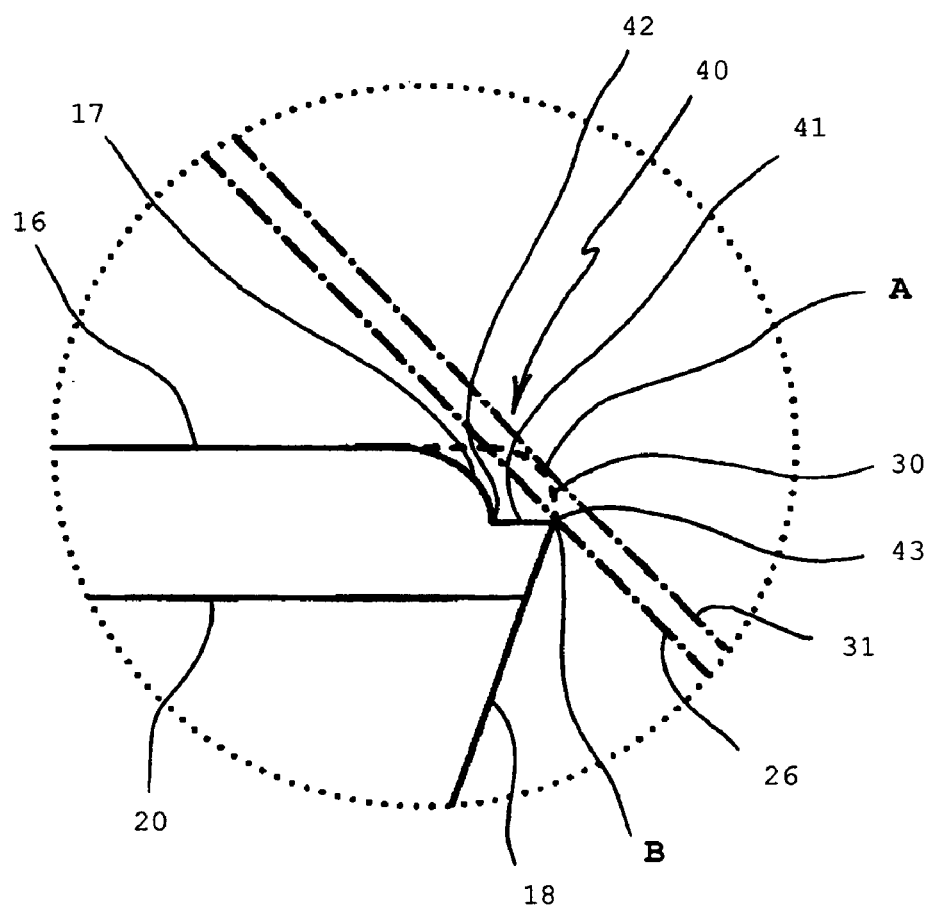
FIG. 4 shows a detail Z of the transverse element which is shown in FIG. 2.
Figure 4A:
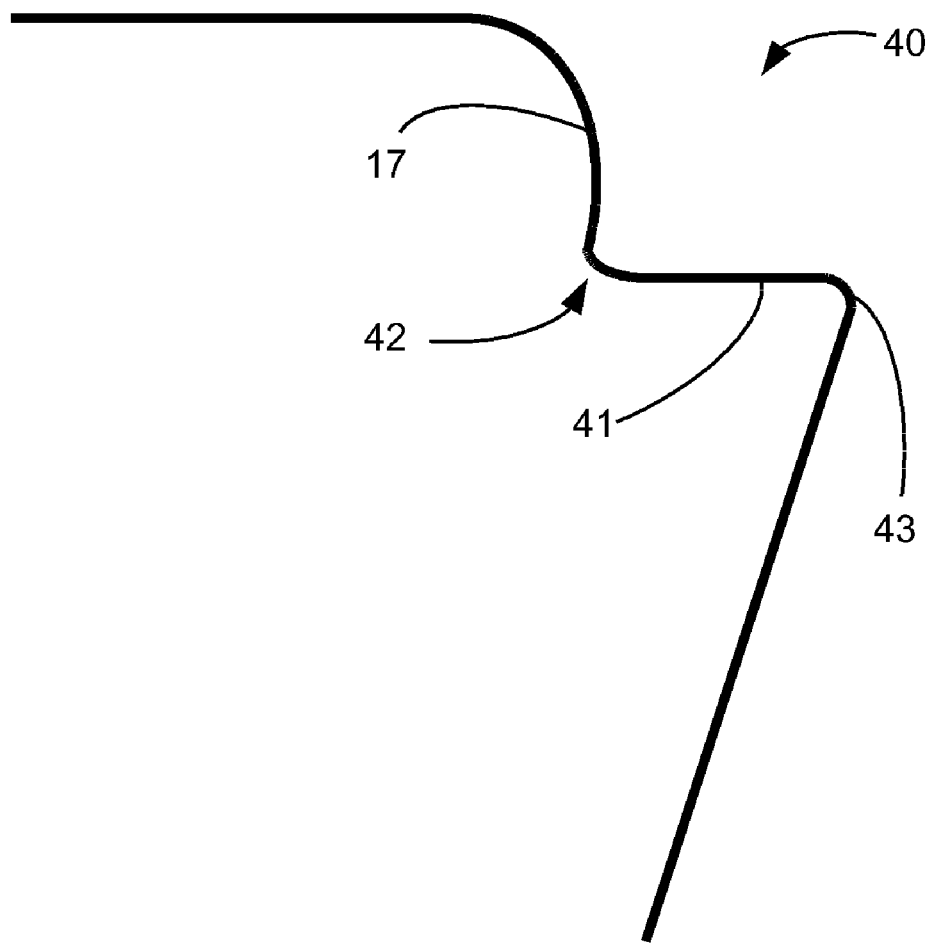
FIG. 4A shows an enlarged detail of a transition edge region of the transverse element, which is shown in FIG. 2 and FIG. 4.

An important difference between the transverse element 10 according to the present invention and the transverse element according to the state of the art relates to the design at the transition of the supporting surface 16 to the pulley sheave contact surface 18, and is illustrated by means of FIG. 4 and FIG. 4A. A region which is located between the supporting surface 16 and the pulley sheave contact surface 18 is hereinafter referred to as transition edge region 40.

As has already been remarked in the foregoing, in the transverse element according to the state of the art, the supporting surface 16 and the pulley sheave contact surface 18 are interconnected through a curved transition surface. In FIG. 4, this curved transition surface is depicted by means of a dashed line and indicated by the reference numeral 30. An imaginary tangent plane, which touches the circumferential surface 25 of the transverse element at both the basic portion 13 and the top portion 15, touches the basic portion 13 at the curved transition surface 30 between the supporting surface 16 and the pulley sheave contact surface 18. In FIG. 4, this tangent plane is depicted by means of a dash and dot line, and indicated by reference numeral 31. A tangent line between the tangent plane 31 and the transition surface 30 is indicated by the letter A.

The transverse element 10 according to the present invention comprises a curved transition surface 17, which is connected to the supporting surface 16 on an interior side and extends toward the direction of the pulley sheave contact surface 18 on an exterior side. In the shown example, the shape of this transition surface 17 is comparable to the shape of the transition surface 30 of the transverse element according to the state of the art, as becomes apparent from FIG. 4 and FIG. 4A. The curvature of the transition surface 17 is convex, wherein the transition surface 17 is declined in the direction of the tilting line 20, starting from the supporting surface 16.

According to an important aspect of the present invention, a distance surface 41 is located between the transition surface 17, on an interior side, and the pulley sheave contact surface 18, on an exterior side. The distance surface 41 in its entirety is situated below the supporting surface 16, and, in the shown example, extends substantially parallel to the supporting surface 16. Furthermore, the distance surface 41 is connected to the curved transition surface 17 through a concave portion 42, and to the pulley sheave contact surface 18 through a rounded off surface 43. In this example, the transverse element 10 is rounded off relatively sharply, wherein a relatively small rounding-off radius is applied, at the connection of the distance surface 41 to the pulley sheave contact surface 18. This is not essential; the transverse element 10 may be rounded off less sharply than in the shown example at this connection of the distance surface 41 to the pulley sheave contact surface 18.

The tangent plane 26, which touches the circumferential surface 25 of the transverse element 10 at both the basic portion 13 and the top portion 15, touches the basic portion 13 at the rounded off surface 43. In FIG. 4, the tangent plane 26 is depicted by means of a dash and dot line. A tangent line between the tangent plane 26 and the rounded off surface 43 is indicated by the letter B. In FIG. 4, it can clearly be seen that the tangent line B is situated at a lower position than the tangent line A. According to an important aspect of the present invention, the distance between the tangent line B and the pulley sheave contact surface 18 is as small as possible.

When a relatively large collision element touches the transverse element 10 at a place which is also touched by the tangent plane 26, protrusions are developed on the distance surface 41. The height difference between the supporting surface 16 and the distance surface 41 can be considerably larger than the height of these protrusions, so that the protrusions are prevented from protruding above the level of the supporting surface 16.

It is also apparent from FIG. 4, that in the transverse element according to the state of the art, a distance between the supporting surface 16 and the tangent line A, which is measured along the surface, is smaller than a distance between the supporting surface 16 and the tangent line B, which is measured along the surface, in the transverse element 10 according to the present invention. Consequently, in the latter transverse element 10, it is not possible for protrusions to develop at the supporting surface 16 itself. Due to this fact and the above-described fact that the protrusions do not protrude above the level of the supporting surface 16, damage of the rings 8 can not occur when transverse elements 10 according to the present invention are applied. This is an important advantage with respect to the state of the art.

A suitable value of the dimension of the distance surface 41 in the horizontal transverse direction is 0.2 mm. In case of such width of the distance surface 41, it is ensured that it is not possible for protrusions to be developed at the transition surface 17 and/or the supporting surface 16 as a result of a collision between the transverse element 10 and a relatively large collision element according to the tangent plane 26.

Assuming a certain width of the rings 8, an upper limit for the dimension of the distance surface 41 in the horizontal transverse direction is determined by the fact that the dimensions of an unsupported end of the rings 8 have to remain between limits, because otherwise breaking of the rings 8 may occur.

With respect to the determination of a suitable value of the height difference between the supporting surface 16 and the distance surface 41, two factors play an important role. The height difference may not be so small that the protrusions on the distance surface 41 are capable of touching the rings 8. On the other hand, it is important that the height difference remains between limits, so that the pulley sheave contact surface 18 keeps a surface which is as large as possible. Accounting for these factors, it has appeared that 0.2 mm is a suitable value for the height difference between the supporting surface 16 and the distance surface 41.

In the transverse element according to the state of the art, the transition edge region 40 exclusively comprises the curved transition surface 30, which has a convex shape. Conversely, in the transition edge area 40 of the transverse element 10 according to the present invention, more than one curved portions may be distinguished. In the shown example, the transition edge region 40 comprises two convex portions, wherein a first convex portion is connected to the supporting surface 16, and comprises the curved transition surface 17, and wherein a second convex portion is connected to the pulley sheave contact surface 18, and comprises the rounded off surface 43. Furthermore, the transition edge region 40 comprises the concave portion 42, which is located between the first convex portion and the second convex portion.

In comparison with the tangent plane 26 which touches the circumferential surface 25 of the transverse element 10 at both the second convex portion and the top portion 15, an imaginary tangent plane (not shown) which touches the circumferential surface 25 at both the first convex portion and the top portion 15, is situated more to the inside, i.e. closer to the neck portion 14. The tangent line B, along which the tangent plane 26 touches the transverse element 10, is situated outside of the range of the tangent plane touching the first convex portion. A relatively large collision element will only be capable of touching the transverse element 10 along the tangent line B, it will not be capable of touching the curved transition surface 17. In this way, protrusions are prevented from developing on the supporting surface 16, and protrusions are also prevented from developing at such a place on the curved transition surface 17, that these protrusions protrude above the level of the supporting surface 16.

It will be clear to a person skilled in the art that the scope of the present invention is not limited to the examples discussed in the foregoing, but that several amendments and modifications thereof are possible without deviating from the scope of the invention as defined in the attached claims.

Many alternatives exist with respect to the design of the transverse element 10 at the transition of the supporting surface 16 to the pulley sheave contact surface 18. Within the scope of the present invention, it is important that an imaginary tangent plane 26, which touches the circumferential surface 25 of the transverse element 10 at both the basic portion 13 and the top portion 15, does not touch the supporting surface 16, and also does not touch the curved transition surface 17. When, as a result of a collision between the transverse element 10 and a relatively large collision element, protrusions are developed, these protrusions are prevented from inflicting damage on the rings 8. In such case, these protrusions are located at a place at which it is not possible that the protrusions come into contact with the rings 8.

The distance surface 41 may be completely flat, as is the case in the shown example, but may also be curved, wherein the value of the radius of curvature may vary along the distance surface 41. When the distance surface 41 is completely flat, it is not necessary that the distance surface 41 extends substantially parallel to the supporting surface 16. Furthermore, the distance surface 41 may comprise more than one surface portions, which extend in different directions.

The value of the radius of curvature of the curvature of the transition surface 17 may vary along the transition surface 17. In a comparable way, with respect to the value of the rounding-off radius of the rounded off surface 43, it is true that this may vary along the rounded off surface 43.

An important aspect of the present invention is that the supporting surface 16 and the curved transition surface 17 connected thereto are situated at a distance from the tangent plane 26 which touches the circumferential surface 25 of the transverse element 10 at both the basic portion 13 and the top portion 15.

Thus, the present invention provides a transverse element 10 for a push belt 6 for a continuously variable transmission 1, which comprises a supporting surface 16 for supporting a carrier 7 of the push belt 6, and a pulley sheave contact surface 18 for contacting pulley sheaves of the continuously variable transmission 1.

A curved transition surface 17 is connected to the supporting surface 16, whereas a distance surface 41 is located between this transition surface 17 and the pulley sheave contact surface 18. The distance surface 41 is positioned lower than the supporting surface 16. When the transverse element 10 collides with a relatively large collision element, protrusions may be developed exclusively on the distance surface 41. These protrusions are not capable of inflicting damage on a carrier 7 which is to be laid on the supporting surface 16, because these protrusions do not protrude beyond the level of the supporting surface 16.

We claim:

1. A push belt for a continuously variable transmission comprising at least one transverse element, the at least one transverse element comprising:
   - a supporting surface for supporting a carrier of the push belt;
   - a pulley sheave contact surface which is destined to abut against a contact surface of a pulley sheave of a pulley of the continuously variable transmission;
   - a transition edge region which is connected to the supporting surface on a first side, and which is connected to the pulley sheave contact surface on a second side, and which comprises a concave portion, in a plane perpendicular to a circumferential direction of the push belt;
   - wherein the transition edge region of the at least one transverse element comprises a distance surface, which is connected to the pulley sheave contact surface of the at least one transverse element on an exterior side, through a convex rounded off surface, and which is connected to the concave portion of the transition edge region on an interior side; and
   - wherein the distance surface of the transition edge region of the at least one transverse element is substantially flat, and wherein the distance surface extends substantially parallel to the supporting surface of the at least one transverse element.

2. A push belt for a continuously variable transmission comprising at least one transverse element, the at least one transverse element comprising:
- a supporting surface for supporting a carrier of the push belt;
- a pulley sheave contact surface which is destined to abut against a contact surface of a pulley sheave of a pulley of the continuously variable transmission;
- a transition edge region which is connected to the supporting surface on a first side, and which is connected to the pulley sheave contact surface on a second side, and which comprises a concave portion, in a plane perpendicular to a circumferential direction of the push belt; and
- wherein the transition edge region of the at least one transverse element comprises a convexly curved transition surface, which is connected to the supporting surface of the at least one transverse element on an interior side, and which is connected to the concave portion of the transition edge region on an exterior side.

3. A push belt for a continuously variable transmission comprising at least one transverse element, the at least one transverse element comprising:
- a supporting surface for supporting a carrier of the push belt;
- a pulley sheave contact surface which is destined to abut against a contact surface of a pulley sheave of a pulley of the continuously variable transmission;
- a transition edge region which is connected to the supporting surface on a first side, and which is connected to the pulley sheave contact surface on a second side, and which comprises a concave portion, in a plane perpendicular to a circumferential direction of the push belt;
- wherein the transition edge region of the at least one transverse element comprises a distance surface, which is connected to the pulley sheave contact surface of the at least one transverse element on an exterior side, through a convex rounded off surface, and which is connected to the concave portion of the transition edge region on an interior side; and
- wherein the transition edge region of the at least one transverse element comprises a convexly curved transition surface, which is connected to the supporting surface of the at least one transverse element on an interior side, and which is connected to the concave portion of the at least one transverse element on an exterior side.

* * * * *